July 14, 1953 F. R. CLARK ET AL 2,645,447
VOLUMETRIC FILLING MACHINE WITH WEIGHT CONTROL
Filed Sept. 19, 1947 6 Sheets-Sheet 1

Fig. 1

INVENTORS
FRANCIS ROSS CLARK
JOHN APONOVITCH
BY
Trenton Meredith
ATTORNEY

INVENTORS
FRANCIS ROSS CLARK
JOHN A PONOVITCH
BY
Trenton Meredith
ATTORNEY

July 14, 1953  F. R. CLARK ET AL  2,645,447
VOLUMETRIC FILLING MACHINE WITH WEIGHT CONTROL
Filed Sept. 19, 1947  6 Sheets-Sheet 5

INVENTORS
FRANCIS ROSS CLARK
JOHN APONOVITCH
BY
Grinton Meredith
ATTORNEY

Patented July 14, 1953

2,645,447

UNITED STATES PATENT OFFICE 2,645,447

VOLUMETRIC FILLING MACHINE WITH WEIGHT CONTROL

Francis Ross Clark, Orange, and John Aponovitch, East North Bergen, N. J., assignors to Colgate-Palmolive-Peet Company, Jersey City, N. J., a corporation of Delaware Application September 19, 1947, Serial No. 775,106

6 Claims. (Cl. 249—2)

This invention relates to devices for dispensing granular solids in parcels of substantially uniform weight by means of adjustable intermediate volumetric containers.

In the preparation of granular solids for marketing, where the materials are to be packed into cartons, bags or other containers, uniformly by weight or otherwise, it is very often desirable that the materials be measured for filling by volume. Most granular solids, for example spray dried soaps, detergents and other soft chemical products, materials comminuted by crystallization, including sugar, salt and others, materials ground to the desired size and still other finely divided substances, rarely exhibit uniform apparent density. Consequent to such non-uniformity, it is often desirable that the filled containers be checked as to weight and appropriate adjustments made in the volumes supplied to the containers, in accordance with the density of the material dispensed at any given time.

While heterogeneous density of granular materials is increased where comminuted substances are subjected to intermittent or batch handling, during or subsequent to division and prior to packing or packaging, density fluctuations occur in the carrying out of many continuous processes as well, often times due to inaccuracy of measurement of process variables controlling particle sizes produced, or to time-lag, or hysteresis, in the operation of automatic correcting devices or other discrepancy.

It is manifestly desirable that means be available for supplying buyers of granular materials with the amounts purchased in weights corresponding or very nearly corresponding with weights as represented by the seller.

It is, therefore, an object of the present invention to provide a volumetric filling device adapted for use in dispensing granular solids in substantially uniform weight amounts.

It is a further object of this invention to provide a weight-compensated volumetric device for continuously filling cartons or the like with granular solids, which is capable of repeated compensation of the volume of material dispensed without interruption of a filling and a conveying operation.

It is a still further object of this invention to provide a weight-compensated volumetric device for use in continuously filling containers with granular solids in which the increments of the volume employed in the compensation are substantially proportional to any deviation from the prescribed weight.

Still other objects and advantages of the present invention will be apparent to those skilled in the art from the following description, when read in connection with the accompanying drawings, in which.

Generally speaking, the present invention comprises in combination a volumetric filler having adjustable measuring containers, a scale for determining the weight of a plurality of filled receptacles, and means for adjusting the volume of the measuring containers if the scale indicates deviation from a predetermined value.

Figure 1:
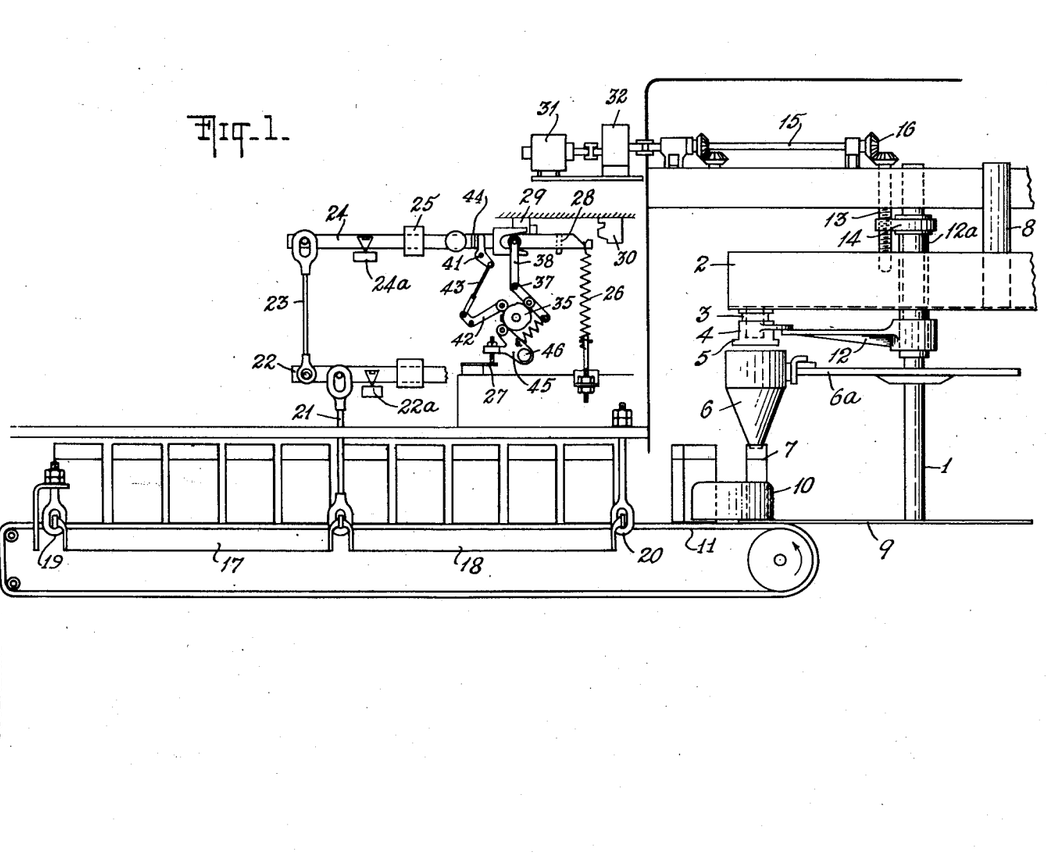
Figure 1 is a side elevation showing an integrated mechanical apparatus for carrying out the objects of the present invention.

Referring now to Figure 1 of the accompanying drawings, a continuous filling device of known construction is shown which comprises a vertical central shaft 1, on which is mounted a hollow, pan-like receiving container 2, a spider 12, a wheel 6a, and a carton rack 9. Telescopic delivering cups 3 and 4 define one of a plurality of volumetric measuring containers positioned underneath the receiving container 2 to which the inner cups 3 are secured. The several outer telescopic cups 4 are provided with gates 5 for releasing charges held thereby to funnels 6 which are mounted on the wheel 6a, whereby the material so released is delivered to cartons 7 carried by rack 9. The container 2, spider 12, wheel 6a, rack 9 and parts mounted thereon rotate with the central shaft. Material is fed to the receiving container 2 by feed pipe 8, which is so positioned that, upon rotation, the space defined by each pair of telescopic cups is filled substantially level with the horizontal inside bottom surface of the receiver upon each passage beneath the pipe.

In normal operation of the filler, empty cartons are introduced upon the rotating rack 9 and are carried thereby in a circular course about the central shaft, during which each carton remains underneath a funnel 6. During the period of revolution, the volumetric measuring containers defined by the telescopic cups are filled from the feed pipe, subsequent to which the gates 5 are opened, thereby releasing the material charges from the cups, causing them to be delivered to the cartons. After approximately 270° of rotation, during which the aforementioned steps have taken place, the cartons are dislodged from the rack 9 as a result of contact with the curved surface of plate 10 and deposited on conveyor 11.

The spider 12 is mounted on a sleeve 12a which is keyed to but vertically slidable along shaft 1. The vertical position of spider 12 is determined by the angular position of jackscrew 13 by engagement through threaded lug 14, which is rotatably attached to sleeve 12a. It may thus be clearly seen that rotation of jackscrew 13 through a shaft 15, which is shown connected thereto by bevel gears 16, causes a change in the volume of the material charge delivered to each carton through the apparatus.

The filling device per se forms no part of the present invention and any other volumetric filler having adjustable containers comparable to 3, 4 may be used as the filling element of the present invention.

The conveyor belt 11, in carrying the evenly spaced filled cartons away from the volumetric filler, slides over a scale platform, which is constructed in two sections 17 and 18. As may be seen in Fig. 1, the platform sections 17 and 18 are long enough to accommodate or hold a plurality of filled containers, e. g., five filled containers each making a total of ten containers on the platform simultaneously so that the scale determines the weight of this plurality of filled containers. Such a plurality has the advantage that accidental imperfect filling on one container among this number does not substantially affect the combined weight. The respective sections are supported by fulcrum hangers 19 and 20 and beam suspension link 21. The link 21 operates through weighted lever 22 fulcrumed at 22a and another link 23, thereby actuating the scale beam 24, fulcrumed at 24a. Scale beam 24 is supplied with adjustable rider weights 25 and a tension spring 26 which may be oriented so as to balance when the belt 11, in passing over the platform sections, carries the plurality of properly spaced cartons filled to the correct weight.

During operation, the beam 24, which is normally locked in a horizontal position, is periodically released for weighing through operation of a mechanical linkage to be described hereinafter. When the beam is released to indicate the weight of the plurality of packages on the conveyor, microswitch 27 is closed and a horizontal target 28, attached to the scale beam intercepts more or less of the radiation passing between light source 29 and photoelectric cell 30. Closure of the microswitch 27 energizes circuits associated with the direct current motor 31, said circuits being so arranged that, during the period of energization, the rotational direction and speed of the motor are functions of the degree to which light is excluded from the photocell 30 by the target 28. The motor acts through reduction gears 32 to drive the shaft 15, thus effecting corrections in the volume of material delivered to the cartons which are proportional to the density fluctuations of said material, and making possible pre-determination and adherence to a desired package weight, regardless of such fluctuation.

Figure 2:
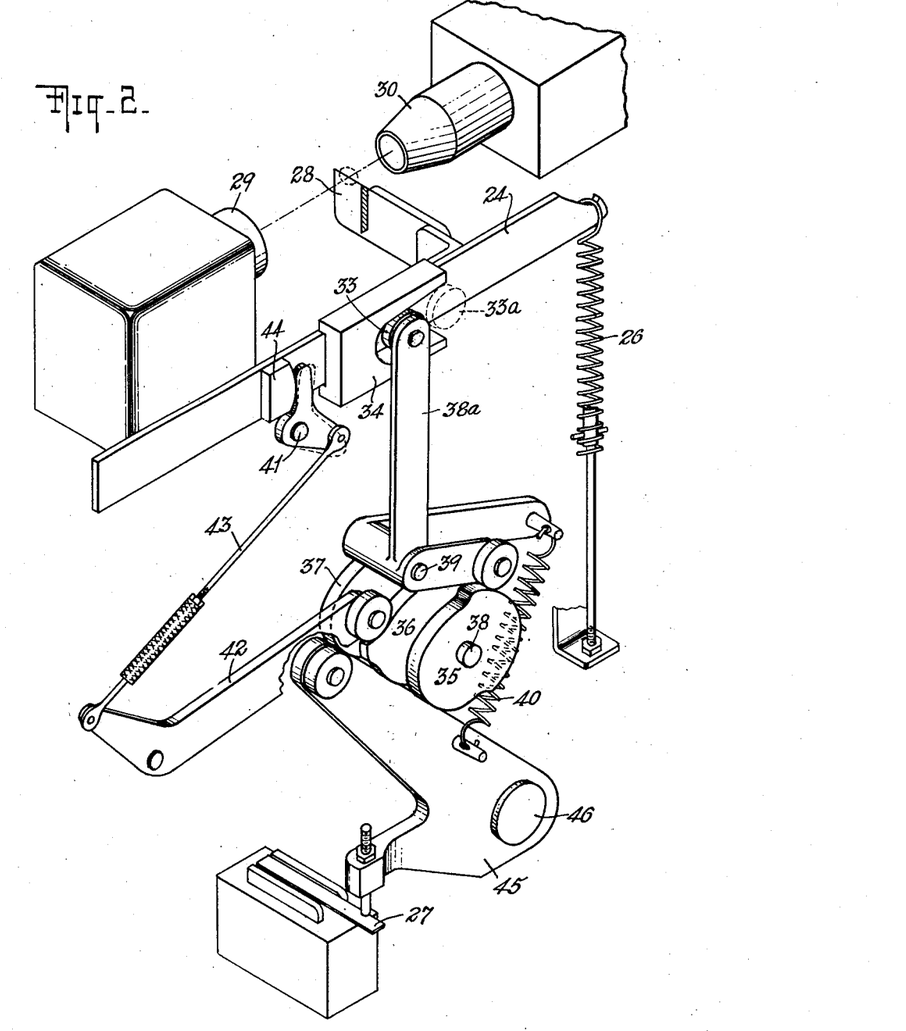
Figure 2 is a semi-detailed auxiliary view of a mechanical structure which may be utilized in carrying out an operational cycle of the device shown in Figure 1.

Referring now to Figure 2 of the drawings, a system of cams and cam followers is shown, which may be used to time the respective functions in a weighing cycle.

The successive events of a preferred cycle, taken in chronological order, may conform to a pattern such as the following:

Granular material is continuously packaged in the filler of Figure 1, with filled cartons passing over the scale platforms of the weigher in the manner previously described. Roller 33 is normally engaged with V-block 34, holding the scale beam in the "correct weight" position, with the target 28 shielding exactly one-half of the sensitive area of photocell 30 from light source 29.

Cams 35, 36, and 37 are mounted on a common shaft 38 and are rotated at constant speed by connection to the conveyor, or otherwise, for the purpose of timing the respective events of the weighing cycle.

In commencing the cycle, cam 35 permits bell crank lever 38a to be rotated about shaft 39 by the spring 40, thereby moving the roller 33 to position 33a, and permitting the scale beam to adjust its level according to the weight of the plurality of packages on the conveyor belt. Next, after the lapse of a period of time sufficient for the scale beam to arrive at a balance suitable to the package weight, arrestor 41 is caused by cam 36, acting through lever 42 and rod 43, to swing into contact with block 44, locking the beam in the position assumed by the balance of the packages on the conveyor against the forces exerted by the spring 26 and weights 25.

Immediately upon locking of the scale beam into indicating position, cam 37 causes motion of lever 45 about shaft 46, which closes microswitch 27, thereby energizing circuits associated with the photocell 30 and the direct current motor 31 for correcting the volume delivered by the filler in accordance with the amount of light excluded from the photocell by the target 28.

The purpose of the locking device which comprises the roller 33 and the V-block 34 is to accomplish the function of holding the scale beam in a neutral, safe position between weighings, so as to prevent needless movement, and in particular the harmful effects of continued periodic motion in the event of harmonic vibration within the system. Upon release of the roller to position 33a, each new weighing is commenced under identical conditions, in addition to which undue oscillation of the beam during weighing is limited by the roller upon engaging the diverging portions of the V-block.

The spring 40, which is attached at one end to the bell crank lever 38a, is fastened at its other end to lever 45, thus serving to provide a constant tendency for the microswitch to remain open as well as for roller 33 to remain disengaged, both of which conditions require the action of the respective cams for alteration in conformance with the events of the cycle.

It has been shown that circuits associated with the direct current motor 31 are energized during weighing cycles for a predetermined length of time which is substantially the same for each cycle. The rotational direction and the speed of the motor during the period of energization may be effectively controlled by altering, respectively, the direction and magnitude of the current passing through the armature of said motor.

Figure 3:
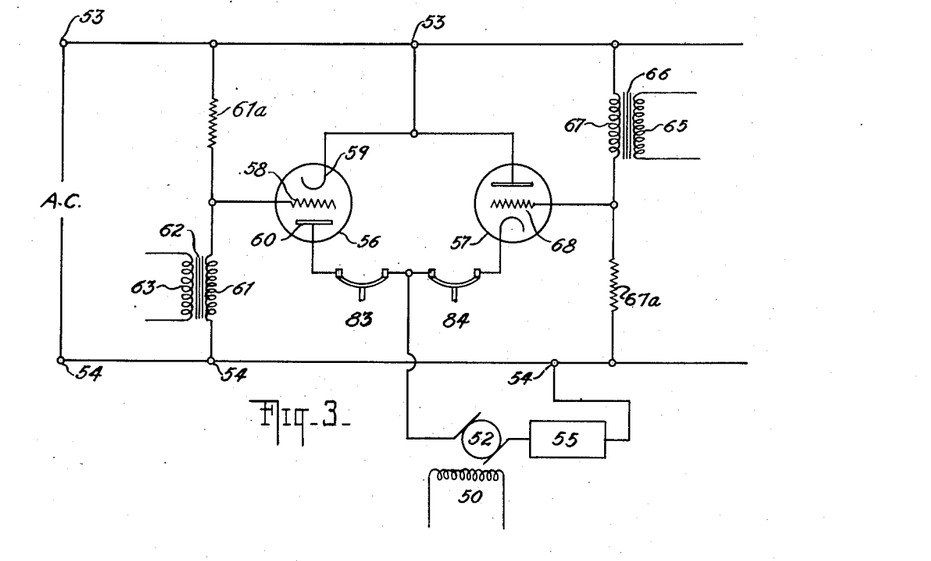
Figure 3 is a wiring diagram depicting electrical elements for use in one form of the invention.

Referring now to Figure 3 of the accompanying drawings, the magnetic field winding 50 of the direct current motor is continuously subjected to a constant uni-directional current, which is rectified, generated or otherwise provided.

The armature circuit 52 of the direct current motor is connected across an alternating current supply, defined by terminals 53 and 54, in series with time delay relay 55 and gas-filled thyratron tubes 56 and 57, which are connected back to back. As the thyratron tubes are each capable of passing current in one direction only, conductance by either alone causes rotation of the motor in one direction only, conductance in the other causing motion in reverse thereof.

The conducting characteristics of the thyratrons are effectively governed by alteration of the phase relationships which exist between the periodic fluctuations of potential in their grid and plate circuits, respectively, and when the armature 52 is connected with the thyratrons, by virtue of closure of the time delay relay switch 55, control of the motor may be had by causing either thyratron to conduct more or less current, according to the desired direction and speed of rotation.

The potential of the grid 58 of thyratron 56 relative to the cathode 59 is caused to undergo periodic fluctuations which originate in the alternating voltage impressed across the terminals 53 and 54. The phase relationship of these fluctuations with those between plate 60 and the cathode 59 depend upon the impedance of the current path through alternating current winding 61 of a saturable reactor 62 and resistor 61a, which is in turn dependent upon relative saturation of the metallic cores of the reactor, such saturation being a function of the magnitude of direct current flowing through winding 63.

Thus, where relay 55 is closed by closure of microswitch 27, and terminal 54 goes positive during any given half-cycle, and the portion of the half-cycle at which tube 56 commences to conduct is dependent upon the time-lag of grid 58 in becoming positive relative to the time at which plate 60 becomes positive, it can be clearly seen that the amount of current flow through thyratron 56 is proportional to the magnitude of the direct current flowing through winding 63, any increase in said direct current causing a decrease of reactance in the alternating circuit and decreasing the delay of the grid in following voltage fluctuations of terminal 54.

Alterations in direct current carried by winding 65 of saturable reactor 66 cause variations in impedance of the path defined by winding 67 and resistor 67a and have similar hysteresis effects upon grid 68 of thyratron 57 as those previously described with respect to thyratron 56, with the difference that tube 57 is disposed for conducting only during alternate half-cycles as tube 56, and in the opposite direction.

It will be clear to one skilled in the art that during such periods as relay 55 is closed, and the terminals 53 and 54 energized with alternating potential, control may be had of the current in armature 52, as to magnitude and direction, by varying the magnitudes of the direct currents flowing in windings 63 and 65.

Figure 4:
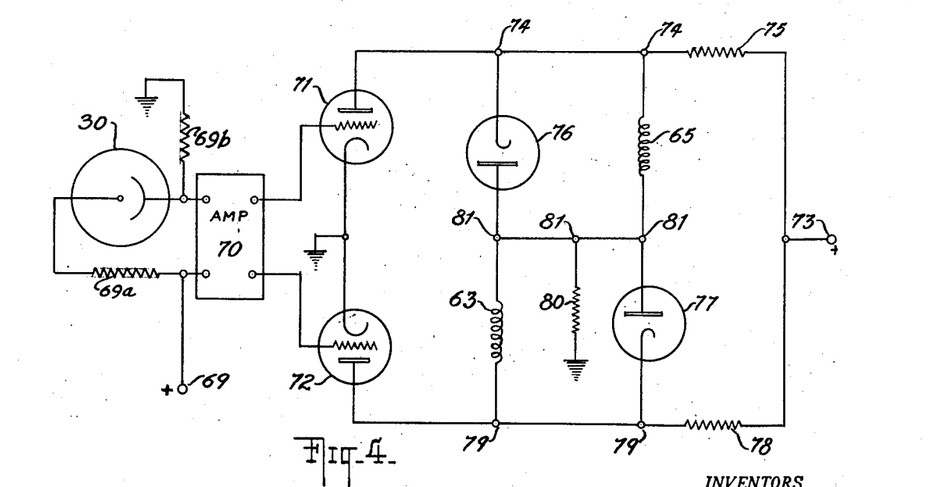
Figure 4 is a wiring diagram depicting elements for converting light impulses into electrical energy in accordance with one form of the invention.

From Figure 4 of the drawings, it may be seen that minute changes in the conductivity of the photoelectric cell 30 affect the amount of current flowing from terminal 69 through resistor 69a, cell 30 and resistor 69b to ground, the potential between 69 and ground being maintained at a relatively high, constant voltage. The voltage changes across 30 and 69a, magnified in amplifier 70, affect the relation of grid potential between twin triode amplifier tubes 71 and 72 which are connected for "push-pull" characteristics. Conductance by either of the triode amplifier tubes affect the flow of current in the direct current windings 63 and 65 of the saturable reactors.

The "push-pull" relationship of the triode amplifier tubes 71 and 72 causes them to manifest the usual class B characteristics of this type of amplifier, namely, that conductance by either tube is accompanied by inactivity in the other.

A dual effect is had upon the relative intensity of the currents in windings 63 and 65 as a result of changes in the amount of light incident upon photocell 30, in that current continuously flows in both windings between ground and positive terminal 73, and that conductance by either amplifier tube 71 or 72 results in an increase in the current of one winding and a decrease in the current of the other. Conductance by tube 71, for example, decreases the positive potential at terminal 74, as a result of IR drop across resistor 75, thereby decreasing the voltage difference and consequently the current between ground and terminal 74, which flows through winding 65. A corresponding increase is simultaneously had in the current of winding 63 as a result of the potential drop of terminal 74, which permits conductance by diode 76, which is connected in series with winding 63. In like manner, conductance by tube 72 increases the current of winding 65 through diode 77 and limits the current of 63 as a result of IR drop through resistor 78, by virtue of a decrease in positive potential of terminal 79.

An effect of the circuit arrangement shown in Figure 4, which causes increase in the flux of one saturable reactor and a simultaneous decrease in the other upon motion of the scale beam, is to insure that the armature circuit 52 is never subjected to an alternating current. Resistor 80, interposed between ground and terminal 81, may be so chosen that when the scale beam is in the "correct weight" position, the current in windings 63 and 65 is such as to hold both the thyratrons at or near complete cutoff. Any decrease in either winding will then have little or no effect except to decrease the possibility of conductance by the corresponding thyratron, while the proportional effect of scale beam deflection is accomplished through the quasi-linear increase of current through one winding, thereby permitting conductance by its thyratron.

An additional precaution against injury to the direct current motor 31 may be embodied in the apparatus by including a filter in the armature circuit 52.

Figure 5:
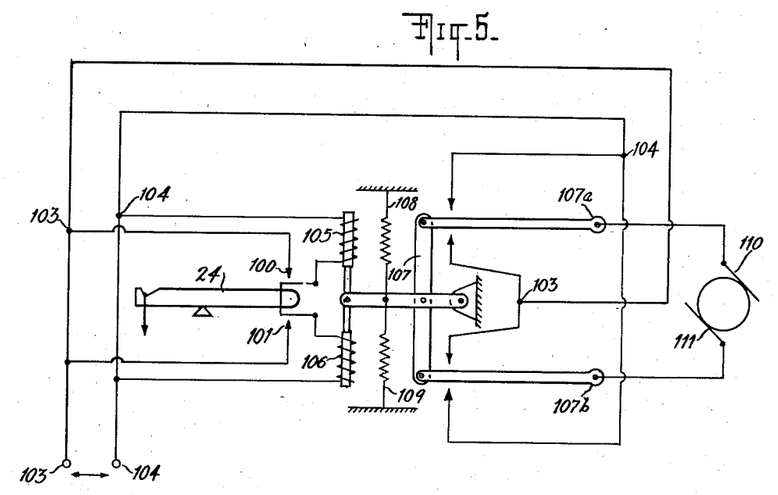
Figure 5 is a diagram showing electrical elements which may be used in the device of the invention.

Referring now to Figure 5 of the drawings, a different form of apparatus is shown which may be utilized in accordance with the invention for incorporating corrections in a volumetric filler. Corrections applied in the apparatus are effected by causing a motor associated with the filler to run in a direction according to the direction of scale beam deflection, at a predetermined speed, for a period of time which is variable in accordance with the necessary correction in volume of delivery.

In the drawing, microswitches 100 and 101 are so positioned as to be actuable by the scale beam 24 when the beam moves outside of the desired weight range; when packages leaving the filler weigh more than the desired amount, microswitch 100 is closed by motion of the beam, thereby completing an electrical circuit between terminals 103 and 104 and thus energizing solenoid 105. Similarly, when packages leaving the filler are undesirably light in weight, closure of microswitch 101 causes completion of another circuit between terminals 103 and 104 which actuates solenoid 106.

A double pole, double-throw, insulated reversing switch 107, mounted on pivots 107a and 107b, is associated with the solenoids 105 and 106, and is held normally in an open position by springs 108 and 109. Closure of the reversing switch in one position serves to energize armature 110 of driving motor 111 for operation in one direction, while closure of the switch in the opposite position serves to reverse the direction of current in the armature, and so reverse the rotational direction of the motor. When the scale beam is balanced, and both microswitches open, the switch 107 is held open by the springs, and the motor maintained at standstill.

In carrying out a weighing cycle wherein the device of Figure 5 is utilized for controlling volume of delivery in an automatic filler, the cam system shown in Figure 2 may be utilized with the exceptions that the arrestor 41 is not employed, and that the microswitch 27 is utilized for providing a potential difference across terminals 103 and 104. The arrestor is dispensed with in this instance for the reason that after release of the scale beam the extent of the activity of the apparatus in correcting the volume of delivery is determined by the length of time during which the respective microswitches 100 and 101 are held closed by the scale beam. It is preferred that the beam be damped, magnetically or otherwise, to prevent sudden reversing of the correcting motor due to the oscillations of the beam, and, in general, to reduce sensitivity to minor fluctuations. Thus if the weight of the plurality of packages on the scale platform deviates only slightly from the predetermined weight, a short period of rotation of driving motor 111 in the proper direction will suffice to correct the weight and, as these packages with the correct weight arrive on the platform of the scale, the beam will be moved from the microswitch it closed and thereby stop the motor 111. On the other hand, if the weight of the plurality of packages deviates a greater amount from the predetermined weight, a longer period of rotation of motor 111 is required to correct the weight and the beam holds the microswitch closed for a longer period until the several packages on the platform correspond in weight to the predetermined weight. Where cyclic operation is used, the cam 35 may restore the beam to the neutral position by means of roller 33 and associated parts before complete correction is achieved, in which case the correcting operations are repeated when roller 33 again releases the scale beam until complete correction is achieved. The responsive characteristics of the system may be varied to suit the need for correction by altering the position of the microswitches 105 and 106 relative to the scale beam, altering the speed of the motor 111 and by changing the shape and rotational speed of the cams which control the events of the cycle. If desired, cyclic operation may be dispensed with and continuous corrections utilized. It is obvious that where continuous corrections, rather than periodic corrections, are utilized the period of time which motor 111 rotates continuously in a given direction varies in accordance with the necessary correction in volume of delivery, i. e., a short period for a slight correction and a longer period for a greater correction. Where periodic corrections are utilized, the same result is achieved but it may be achieved in a succession of incremental changes in volume of the measuring containers where the time required to make the necessary correction is longer than the free period of the scale beam in each cycle of operation. In either case the total period of time of operation of the motor 111 in a given direction to correct the volume of delivery varies in accordance with the amount of correction necessary.

Figure 6:
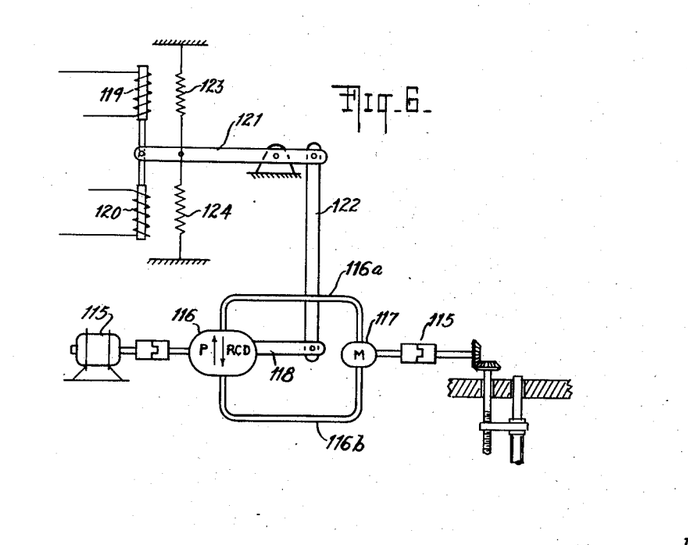
Figures 6 through 10 show several systems which may be used in the invention for transforming weight indications into volume corrections.

Figure 6 of the drawings shows a further form of apparatus for adjusting a volumetric filler in accordance with the invention through the use of a hydraulic system in connection with a microswitch-relay system such as that shown in Figure 5. A motor 115 drives a reversible, constant delivery fluid pump 116 which provides pressure in fluid lines 116a and 116b for operating fluid motor 117, said fluid motor being shafted to the adjustable members of a volumetric filler such as the shaft 15 of Figure 1. The pump 116 is controlled by adjustment of control lever 118 in these positions, two of which correspond to fluid delivery in opposite directions, while the third and middle position occasions no delivery in any direction. Solenoids 119 and 120 are associated with the scale beam in exactly the same manner as solenoids 105 and 106 of Figure 5, and cause appropriate deflection of control lever 118 by acting through lever 121 and arm 122. Springs 123 and 125 hold the system normally in the neutral, middle position so when the scale beam is in normal position corresponding to correct weight in the packages, no changes in filler delivery are effected.

Figures 7, 8, 9:
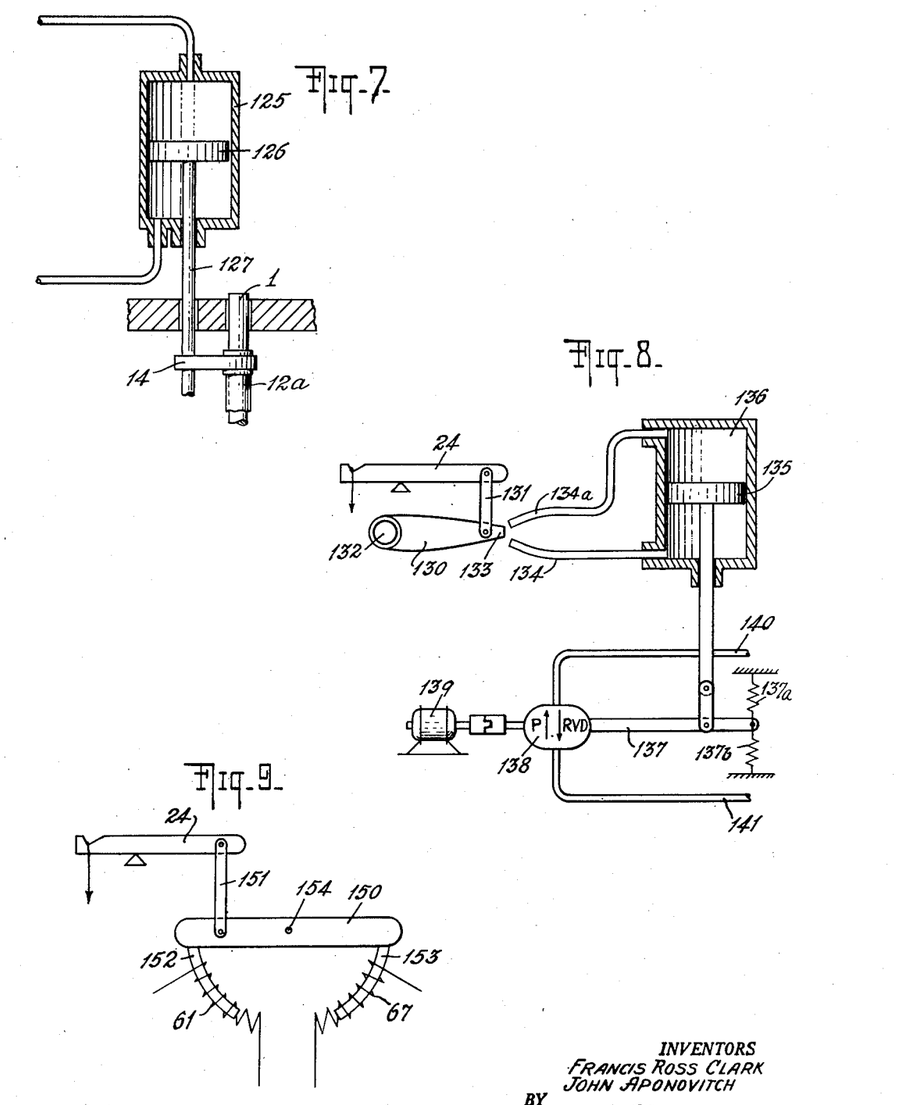

Figure 7 depicts a modified type of motor for adjusting the volumetric filler comprising a reciprocating hydraulic motor having a cylinder 125, a piston 126 and shaft 127 which may be used in place of the rotary hydraulic motor 117 in the apparatus of Figure 6. The motor requires no rotary connection with the adjustable members of the filler, and may act directly on the lug 14 of Figure 1 through translatory motion of the shaft 127.

Figure 8 depicts another modification of the invention, in which a jet-pipe and reciprocal piston type pneumatic relay are used to alter the operation of a hydraulic pump and motor system in effecting corrections in delivery volume of the filler. A jet-pipe 130, linked with a scale beam 24 by rod 131, is pivoted around hollow shaft 132 which has connection to a source of compressed air or other gaseous fluid. Pressurized gas supplied to the jet-pipe is caused to flow therefrom via orifice 133, whereupon the same may enter either or both of the stationary pipes 134 and 134a, depending upon the position of scale beam 24. Pressure variations on the opposite sides of piston 135 within cylinder 136 cause changes in direction and magnitude of the net force exerted by the piston in accordance with the angle at which the jet-pipe delivers its gas, and forces so exerted by the piston are imparted to lever 137, thereby causing changes in position of the lever as a result of the tendency of the system to reach an equlibrium wherein a balance is had between the forces exerted by the springs 137a and 137b and that exerted by the piston, whereby the direction and volume of delivery of the reversible variable delivery pump 138 are varied and, by virtue of connection with a reciprocating, rotary or other fluid motor cause adjustment of the filler in a desired direction and in an amount in accordance with the need therefor.

A weighing cycle which is conveniently carried out with the device of Figure 8 may be controlled effectively by a cam system such as that in Figure 2, wherein arrestor 41 and the microswitch 27 are eliminated, the action of the roller and V-block 33 and 34 serving to fix and release the scale beam 24 for desired intervals of time. If desired, continuous correction may be utilized.

In Figure 9 there is shown a modified system comprising two movable core variable-inductance coils which may be used with a controlled volumetric filler of the type shown in Figures 1, 2 and 3, to the exclusion of the light source, target, photoelectric cell and saturable reactors 62 and 66. In the drawing, lever 150 is attached to scale beam 24 by arm 151. Two soft iron cores, 152 and 153, are positioned on the lever 150 so that upon rotation of the lever about shaft 154, the respective cores may enter into and recede from coils 61 and 67, respectively. The effect had upon deflection of the scale beam as regards adjustment of the reversible, variable speed motor 31 of Figure 1 is the same as the effect described where the impedances of coils 61 and 67 were similarly altered, not by movement of iron cores, but by the direct current saturation of windings 63 and 65.

Figure 10:
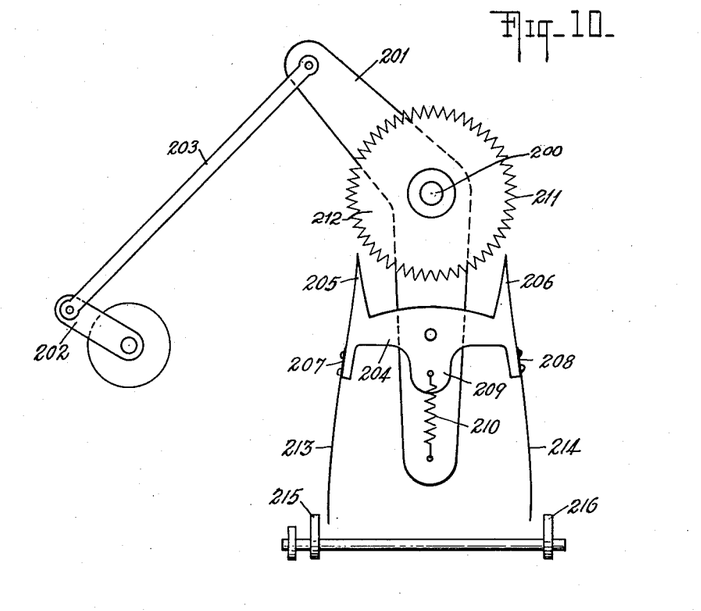

Figure 10 of the drawings shows a further form of the invention in which a mechanical device is employed for correcting the amounts of material delivered by a volumetric filler in accordance with the weight of previously filled packages. A shaft 200 is linked with adjustable members of a filler e. g., the shaft 15 in Fig. 1, so that rotation thereby may be utilized in making adjustments in volume of delivery. A bell lever 201 is rotatably mounted on the shaft 200 and is adapted for oscillatory motion by virtue of the connection of one arm thereof with crank 202 through connecting rod 203. A rigid member 204, pivotably mounted on the other arm of lever 201 carries pawls 205, 206, supports 207, 208 and arm 209, all formed as integral parts thereof. Tension spring 210, fastened near an extremity of lever 201 and on the arm 209 of member 204, causes a constant tendency to orient member 204 so that the pawls 205, 206 remain disengaged from the teeth 211 of wheel 212, which is keyed to shaft 200.

Elongate resilient members 213, 214, preferably made from spring steel or other suitable material and fastened to supports 207, 208, are provided for causing engagement of the pawls 205, 206 with the teeth 211, when alteration of delivery volume becomes necessary. Engagement of the proper pawl with the toothed wheel causes the wheel to be driven thereby during one stroke of the oscillating lever 201.

The respective pawls are caused to engage the toothed wheel as a result of contact of members 213, 214 with anvils 215, 216, the anvils being moved into and out of operating position by a scale beam.

In operation of the device shown, power is supplied from rotation of the crank 202, causing periodic motion of the lever 201 and all parts carried thereby. As long as anvils 215, 216, remain in such position as to allow free oscillation of members 213, 214, wheel 212 remains motionless. Upon deflection of a scale beam, or other weight-actuated mechanism, to cause anvil 215 to be positioned in the line of motion of member 213, the anvil restrains the member 204 from completing a clockwise stroke with lever 201 until member 204 pivots relative to the lever against the force of the spring 210, thereby placing pawl 206 among the teeth 211. The resilience of member 213 causes the pawl 206 to be held in close relation with the teeth 211 until after the return stroke of lever 201 has begun, whereafter the pawl is held in the engaged position by frictional and other resistance of the wheel 212 until the counter-clockwise stroke of lever 201 is completed. When the lever begins its next clockwise stroke, the force exerted by spring 210 returns member 204 to its neutral position. Similarly, when anvil 216 stops member 214 to cause pawl 205 to become engaged, the wheel 212 is caused to turn in a clockwise direction.

The device of Figure 10 causes fixed increments of volume for each stroke during which change is effected. Where large discrepancy exists in material density, the device is capable of making repeated corrections in the proper direction until correct volume is attained.

Figure 11:
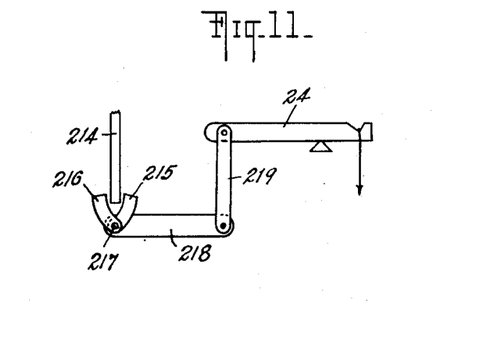
Figure 11 is a fragmentary side elevation of a portion of the device shown in Figure 10.

Figure 11 shows one form of apparatus which may be used with the device shown in Figure 10, for the purpose of causing the anvils 215, 216 to obstruct passage of moving members in accordance with the weight of packages leaving the apparatus. The anvils are keyed to shaft 217 which is mounted for rotation. Crank 218, also keyed to shaft 217, cooperates with rod 219 for transmitting motion of a scale beam 24 into rotation of the shaft. The anvils are so shaped and angularly displaced from each other that the moving members 213, 214 may pass thereby without contact when the scale beam is balanced. When the beam is depressed, however, due to light package-weight, the shaft 217 turns in a clockwise direction, thereby bringing anvil 216 into the path of moving member 214. Heavy packages, on the other hand, raise the scale beam, thereby causing anvil 215 to obstruct member 213.

Safety devices may be profitably installed in any and all of the forms of the invention for preventing excessive correcting action in the event of sudden jar or other mishap. Limit switches, circuit breakers and similar devices may be associated with the adjusting portions of a filler so as to inactivate the motor apparatus connected therewith for motion beyond a desired limit. A convenient and effective mode of application of limit switches in one electrical device comprises insertion thereof as normally closed relays 83 and 84 in the respective thyratron circuits in Figure 3. In such a construction, reverse motion is not hindered, thereby making possible self-correction of the device in case of momentary disturbances causing temporarily excessive need for correction. In pneumatic and hydraulic devices mechanically operable safety valves and/or one or two way by-pass valves may be used for preventing excessive adjustment. In any of the devices which may be used for causing adjustment in accordance with the invention, mechanisms may be utilized which serve to declutch the filler adjusting means from its power source in the event of excessive motion.

The weighing apparatus utilized in the invention need not employ a scale beam as a part thereof, as such is merely a mechanical amplifier and it may be equally feasible, where sensitive responsive devices are used, to utilize directly the vertical motion of a resiliently supported conveyor platform, which motion may be occasioned by fluctuations in package weight, for causing impulses resulting in correcting action.

Magnetic and other damping means may be used in combination with a scale beam or movable platform in any of the preferred forms of the invention, and may particularly be utilized to advantage where it is desirable to eliminate the need for carrying out periodic cycles and to utilize continuous correction.

Although the invention has been described and illustrated by reference to specific embodiments, it is to be understood that they serve only to illustrate the invention and that the various elements thereof may be used as shown or in other combinations and/or with other devices for producing similar results. It should further be understood that the invention is not limited thereby and that such modifications and variations are contemplated as fall within the scope of the appended claims.

What is claimed is:

1. A machine for filling packages with pulverulent material, which may vary in apparent density, to obtain filled packages weighing within a narrow range of a predetermined standard, comprising in combination, a volumetric filling device comprising several measuring containers of adjustable volume, means for filling said measuring containers with a full load of said pulverulent material, means for feeding a succession of empty packages in position to receive said full load from successive measuring containers, a continuously moving conveyor for removing filled packages from the filling device along a fixed course, weighing means for determining the combined weight of a predetermined plural number of filled packages while they are moving in said course, said plural number being sufficiently large that a package in said plurality which is underfilled due to imperfect filling of a container with a full load does not substantially affect said combined weight whereby said combined weight is a practically accurate measure of the apparent density of the pulverulent material in said plurality of packages, and motor means controlled by a deviation of the determined weight of said plurality of packages from a predetermined standard weight therefor for adjusting the volume of said measuring containers in a direction to overcome such deviation.

2. A machine for filling packages as set forth in claim 1 in which timing means operating in timed relation with said conveyor is provided for rendering said weighing and motor control means inoperative except at spaced periods of time.

3. A packaging machine comprising in combination a volumetric filling device having a plurality of measuring containers of adjustable capacity adapted to fill a succession of cartons with a measured volume of flowable solid granular material, said material being subject to variation in apparent density with time, a motor for increasing and decreasing the capacity of said measuring containers, a continuously driven conveyor for removing evenly spaced filled cartons from the filling device, a scale having an elongated platform underlying a portion of said conveyor, said platform being of such length that several cartons rest upon it simultaneously, a movable weight-responsive member operatively connected to said platform, said member having a neutral position corresponding approximately to the desired weight of said several cartons, a movable latch adapted in locking position to lock said weight-responsive member in said neutral position, latch operating means driven in timed relation with said conveyor for moving said latch periodically to unlocking position and returning it to locking position, motor control means responsive to movement of said weight-responsive member from said neutral position for operating said motor to increase the capacity of said measuring containers if the several evenly spaced cartons moving over said platform when said latch is in unlocking position are under the desired weight and to decrease said capacity if overweight.

4. A packaging machine as set forth in claim 3 in which said motor control means is electric.

5. A packaging machine as set forth in claim 3 in which said motor control means is mechanical.

6. A packaging machine as set forth in claim 3 in which said motor control means is fluid.

FRANCIS ROSS CLARK.
JOHN APONOVITCH.

References Cited in the file of this patent

UNITED STATES PATENTS

| Number | Name | Date |
|---|---|---|
| 928,658 | Hoyt | July 20, 1909 |
| 936,557 | Nickerson | Oct. 12, 1909 |
| 1,089,680 | Sloan | Mar. 10, 1914 |
| 1,921,317 | Molins | Aug. 8, 1933 |
| 1,982,127 | Venable | Nov. 27, 1934 |
| 1,994,797 | Thomas | Mar. 19, 1935 |
| 2,037,484 | Raymer | Apr. 14, 1936 |
| 2,050,496 | Mayo | Aug. 11, 1936 |
| 2,055,730 | Rees | Sept. 29, 1936 |
| 2,088,334 | Merchen | July 27, 1937 |
| 2,102,317 | Gwinn | Dec. 14, 1937 |
| 2,273,330 | Robinson | Feb. 17, 1942 |
| 2,285,765 | Carswell | June 9, 1942 |
| 2,305,484 | Merchen | Dec. 15, 1942 |
| 2,309,209 | Palmer | Jan. 26, 1943 |
| 2,333,790 | Howard | Nov. 9, 1943 |
| 2,354,087 | Raymer | July 18, 1944 |
| 2,385,233 | Robinson | Sept. 18, 1945 |
| 2,503,295 | Palmer | Apr. 11, 1950 |
| 2,538,346 | Wood | Jan. 16, 1951 |